United States Patent [19]

Noda

[11] 4,145,015
[45] Mar. 20, 1979

[54] FISHING REEL

[75] Inventor: Hideo Noda, Sakai, Japan

[73] Assignee: Shimano Industrial Company Limited, Osaka, Japan

[21] Appl. No.: 817,441

[22] Filed: Jul. 20, 1977

[30] Foreign Application Priority Data

| Jul. 28, 1976 | [JP] | Japan | 51-101252[U] |
| Aug. 7, 1976 | [JP] | Japan | 51-105572[U] |
| Aug. 7, 1976 | [JP] | Japan | 51-105574[U] |
| Aug. 7, 1976 | [JP] | Japan | 51-105575[U] |

[51] Int. Cl.$^2$ ............................................ A01K 89/01
[52] U.S. Cl. ............................................... 242/84.2 A
[58] Field of Search ............... 242/84.2 P, 84.2 R, 242/84.2 H, 84.2 G, 84.21 R, 84.21 A, 84.2 C

[56] References Cited

U.S. PATENT DOCUMENTS

| 2,767,935 | 10/1956 | Fowler | 242/84.2 F |
| 2,828,927 | 4/1958 | Yeada | 242/84.2 H |
| 2,862,679 | 12/1958 | Denison et al. | 242/84.2 A |
| 3,222,010 | 12/1965 | Borgström et al. | 242/84.2 A |
| 3,223,347 | 12/1965 | Clark | 242/84.2 A |
| 3,488,015 | 1/1970 | Taggart | 242/84.51 R |

FOREIGN PATENT DOCUMENTS 558986  6/1958  Canada .............................. 242/84.2 R

*Primary Examiner*—Billy S. Taylor
*Attorney, Agent, or Firm*—Stevens, Davis, Miller & Mosher

[57] ABSTRACT

A fishing reel has a reel body whose rotary shaft is formed to be at a right angle with respect to a handle shaft so that the reel body may be mounted to a fishing rod by means of a mounting leg in such a manner that a through hole, which is formed in a cover for covering a spool and a rotary frame and from which a fishing line is drawn, is allowed to be at a right angle to the center line with respect to the longitudinal direction of the rod, thereby to draw out the fishing line through the hole substantially at a right angle toward the end of the fishing rod.

7 Claims, 7 Drawing Figures

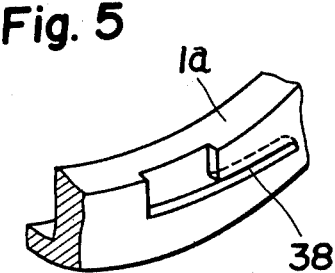
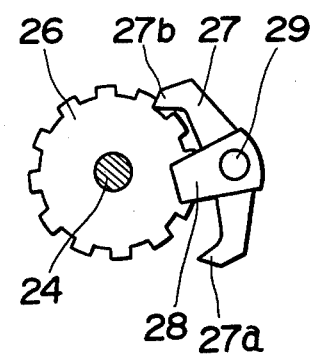
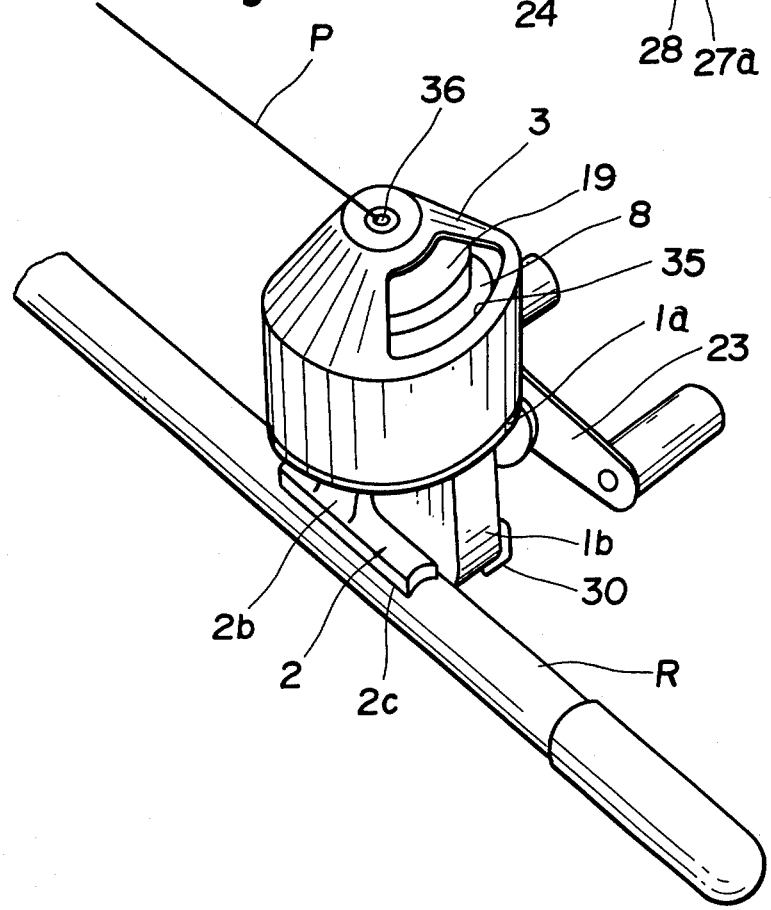

FISHING REEL

The invention relates to a fishing reel and more particularly to a fishing reel, the so-called closed face reel, which is mounted to a fishing rod for winding a fishing line on a spool by operating a handle bar.

Generally, this kind of closed face reel is composed of a spool for winding the fishing line thereon, a rotary frame for guiding the line onto the spool, and a cover of a substantially conical shape for covering the spool and rotary frame. At the top of the cover there is formed a hole through which the line passes, so that the handle bar is operated to rotate the rotary frame for winding the line on the spool.

The through hole on the reel is positioned at the top of the cover most remote from the reel body providing the handle bar and the center line of the hole is made parallel to the longitudinal direction of the rod when the reel is mounted thereto. Hence, there has been the problem in that the reel speed of the fishing line could not be slowed, when drawn from the spool for casting or wound up for catching a hooked fish, i.e., the so-called thumbing was difficult, and an adequate control was not reliable even with the thumbing.

When fishing with a reeled line, it is desirable for an angler to be able to cast the tackle at the end of the line even a fine line toward the desired location and control the reel for playing a hooked fish.

For this purpose to be easy and reliable, the aforesaid thumbing is necessary. In other words, when the running fishing line is slowed, the tackle at the end of the line can be casted accurately to a desired location, and when the line is wound after hooking a fish, the angler can play the hooked fish. A conventionally closed face reel, however, is not constructed so as to control the running of the fishing line when being run out or wound on the spool.

This invention has been designed to solve the aforesaid problem in the conventional reel. An object of the invention is to provide a fishing reel which can control the running or winding of the fishing line i.e., perform the so-called thumbing.

The fishing reel of the invention is provided with a reel body whose handle shaft is formed at a right angle with respect to a rotary shaft driven thereby a spool and a rotary frame, arranged around the rotary shaft respectively; and a mounting leg for mounting thereon the reel body to a fishing rod. The leg has a mounting seat lengthwise extending at a right angle with respect to the axis of the rotary shaft. Hence, when the reel is mounted to the rod through the mounting leg, a through hole formed at the end of a cover for covering the spool and the rotary frame is made substantially at a right angle at its center line to the longitudinal direction of the rod, so that the fishing line may be drawn out of the spool toward the end of the rod through the hole in the relation of being bent at a right angle to the center line thereof.

Accordingly, the angler can, while fishing slow the running of the fishing line by pressure of his thumb or forefinger from the outside of the cover when the line is running or being wound onto the spool through the through hole.

In addition, a cut-out window is formed in the cover to enable the angler to insert his finger into the cover through the window, whereby the thumbing is faciliated even in a reel of a larger size.

These and other objects and advantages of the invention will become more apparent upon a reading of the following detailed specification in accordance with the accompanying drawings, in which:

FIG. 5 is a perspective view of a part of the reel body,

FIG. 6 is an illustration showing the relation between an anti-reverse gear and pawls, and FIG. 7 is a perspective view of the reel when in use.

Referring to FIGS. 1 to 4, there is shown a reel body 1; a leg 2 for mounting the reel body 1 to a fishing rod; and a cover 3 fixed to the reel body 1.

Figure 1:
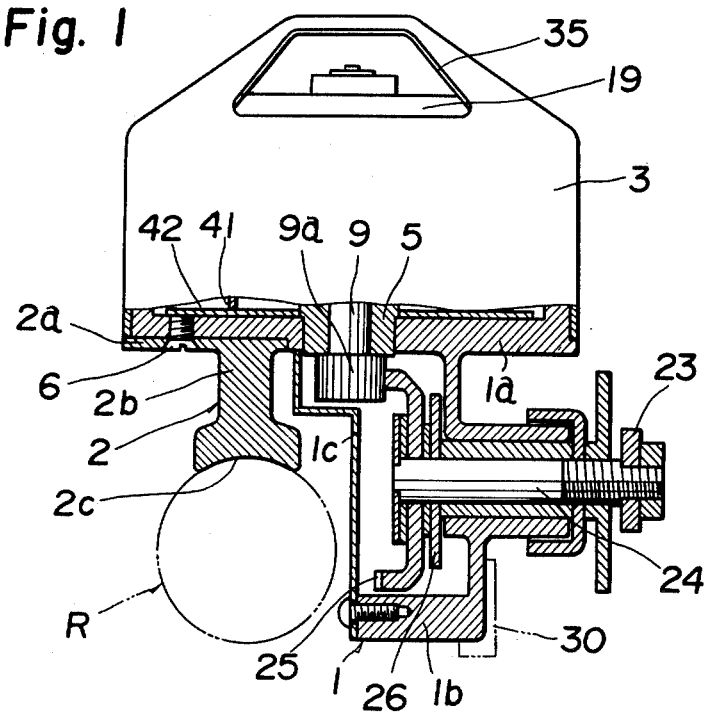
FIG. 1 is a partially cutaway view of the reel of the invention.
Figure 2:
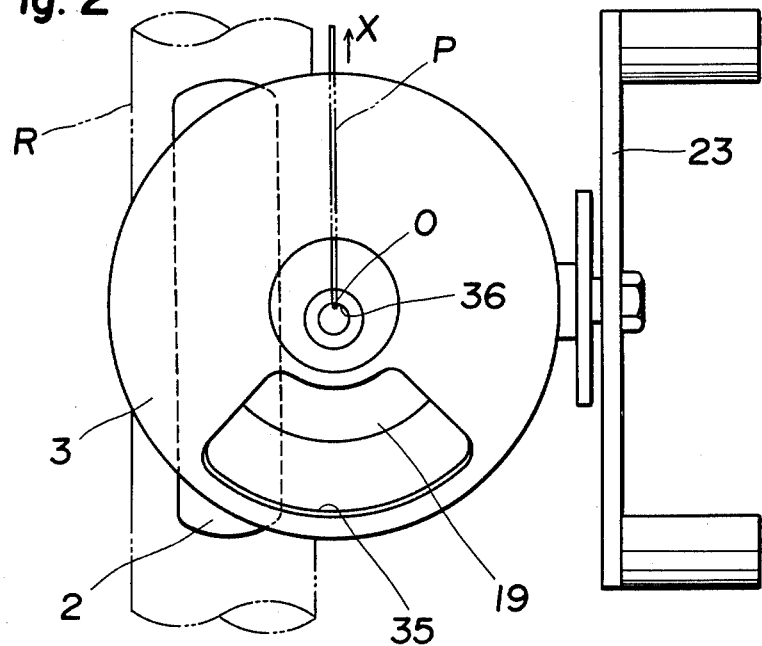
FIG. 2 is a plan view thereof.
Figure 3:
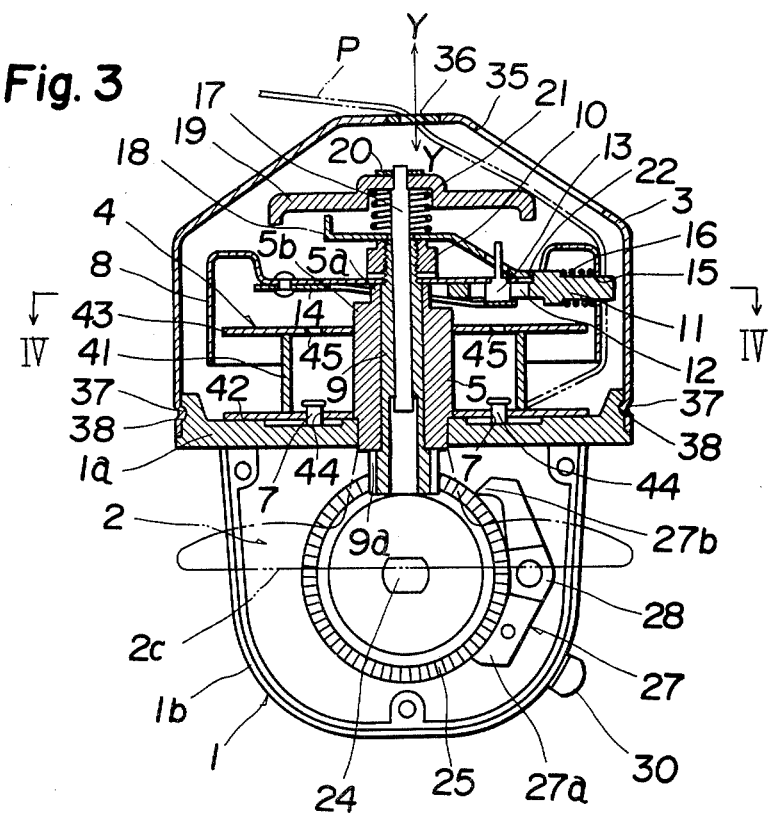
FIG. 3 is a longitudinal section thereof.
Figure 4:
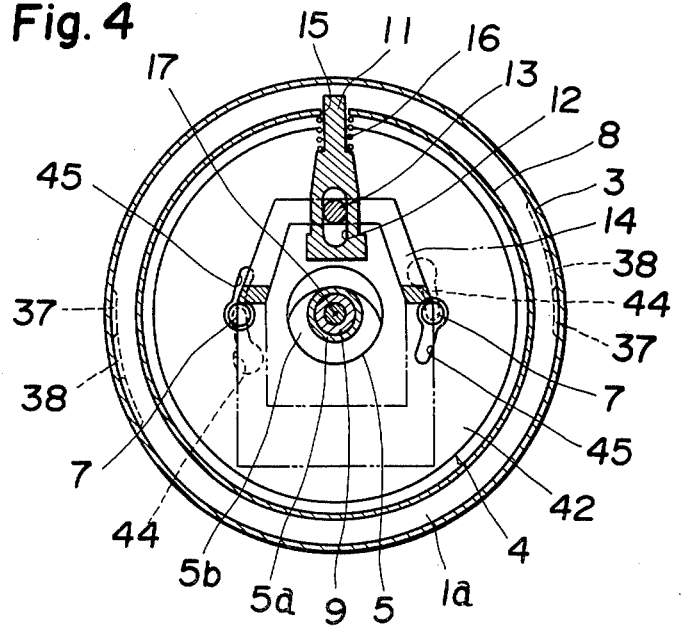
FIG. 4 is a partially omitted section taken on Line IV—IV in FIG. 3.

The reel body 1, as shown in FIGS. 1 to 3, comprises a disc 1a, an open casing 1b extending from the rear surface of the disc 1a at a right angle with respect to the flat surface thereof, and a lid 1c closing the opening of the casing 1b. A through hole is formed at a substantially central portion of the disc 1a, into which hole is insertably fixed a tubular shaft 5. A rotary shaft 9 is rotatably supported on the tubular shaft. A handle shaft 24 to be hereinafter described is supported on the casing 1b in the direction of being at a right angle with respect to the axis of the rotary shaft 9. A transmission to be hereinafter described is housed within the casing so as to transmit the rotary force from the handle shaft 24 to the rotary shaft 9.

The mounting leg 2 is provided with a fixing base 2a, a trunk 2b and a mount seat 2c. The fixing base 2a is detachably fixed by a screw 6 to the rear surface of the disc 1a at one side of the casing 1b. The trunk 2b extends from the base 2a parallel to the axis of the rotary shaft 9. The mount seat 2c is formed at the end of the trunk 2b with a given length in the longitudinal direction of the rod R.

Also, the mount 2c extends substantially at a right angle with respect to the axis of the rotary shaft 9 so that the reel body 1 may be mounted to the rod R through the leg 2 in the relation that the rotary shaft 9 is directed vertically to the longitudinal direction of the rod R.

In other words, the cover 3, which encloses a spool 4 and a rotary frame 8 is attached to the disc 1a of the reel body 1 and, as well-known, is provided with a hole 36 through which a fishing line passes. Hence, the reel body 1 can be mounted to the rod R through the leg 2 so that the center line of the through hole 36 may be made substantially at a right angle to the longitudinal direction of the rod R, whereby the fishing line P can be drawn out of the cover 3 toward the end of rod R through the hole 36 in the relation of being bent substantially at a right angle to the center line (the line Y—Y in FIG. 3) of the hole 36.

In addition, the cover 3 is formed in a cylindrical shape with a conical front part. The conical front part of the cover 3 is provided at its top with the through hole 36 and at the tapered side with a cut-out window 35 as large as the angler's finer which may be inserted therethrough. The cut-out window is not required but preferably may be formed for easy and reliable thumbing as described hereinafter.

Furthermore, the cover 3 is detachably mounted to the disc 1a of the reel body 1 in such a manner that at the inner surface of the cylindrical portion near the opening of the cover there are formed about two or four partial male threads 37 and at the outer periphery of the disc 1a there are formed about two or four partial female threads 38, so that each male thread is screwably engaged with each female one. In this instance, the cut-out window 35 is always facing backward, i.e., toward the bottom of the rod R provided with the reel. However, the cover 3 can be turned at 180° (half a turn) with respect to the disc 1a by means of the threads.

The spool 4, the rotary frame 8, and the transmission for transmitting the rotary force from the handle shaft 24 to the rotary shaft 9, which are housed in the reel body 1, is detailed as follows:

The spool 4, which is sleeved onto the tubular shaft 5 to be fixed to the disc 1a in the relation of being readily turned over, comprises a drum 41, and a pair of discs 42 and 43 each of which have each diameter larger than that of the drum 41 and are fixed to the drum 41 at both axial ends thereof. Each of the discs 42 and 43 have a pair of retaining slots 44 and 45, respectively, of substantially arcuate shapes, and the disc 1a is provided with a pair of retaining headed pins 7 projecting therefrom, so that the pins 7 are retained to one of the pairs of slots 44 and 45, thereby to fix the spool 4 to the disc 1a. In addition, each of the slots 44 and 45 is enlarged at its one end more than the head of each of the pins 7 to facilitate its insertion. Thus, the spool 4, after the insertion, is turned by the length of each slot 44 or 45 to be fixed to the disc 1a through the retaining pins 7, and is reversely turned to be removed from the disc 1a. Alernatively, the spool 4 can be optionally fixed to the disc 1a by contacting either the disc 42 therewith as shown in FIG. 3, or the disc 43 with the disc 1a by turning the spool 4 upside down.

The rotary frame 8, which serves to guide the line to be wound on the spool 4, is composed of a one-end-closed cylinder. A through hole is formed at the center of the closed end and has inserted thereon one end of the rotary shaft 9 protrudent from the tubular shaft 5, so that the rotary frame 8 is fixed to the rotary shaft 9 by a nut 10 in the relation of being rotatable therewith.

On the rotary frame 8 there is provided a leaf spring 14 as shown in FIG. 3. The leaf spring 14 carries a fishing line guide lever 11 radially movable along the inner surface of the closed end of the rotary frame 8. The guide lever 11 is smaller in length than the radius of the rotary frame 8 and has a guide hole 12 at the lengthwise end facing the center of the rotary frame 8, into which guide hole is inserted a guide pin 13 fixed to the inner surface of the closed end of the rotary frame 8 so that the guide lever 11 may be guided by the pin 13 to be unidirectionally movable. A coil spring 16 is inserted between the inner periphery of the cylindrical rotary frame 8 and a notched portion formed at the intermediate portion of the guide lever 11, thereby to urge the guide lever 11 normally toward the center of the rotary frame 8. Also, a through hole 15 is formed at the cylindrical side of the rotary frame 8 into which is insertable the foremost end of the guide lever 11, so that the guide lever 11, as shown in FIG. 3, protrudes at its outermost end outwardly from the cylindrical side of the rotary frame 8.

The rotary shaft 9 is made hollow to accommodate therein a rod 17 in the relation of being freely movable therein. The rod 17 is provided at an end portion projecting from the axial end of the rotary shaft 9 with a platelike stopper 18 which is swingable with respect to the rod 17 and serves to hold the guide lever 11, and at the same end with a disc-like control 19 retained on the 17 by a snap ring 20. The stopper 18 is normally urged toward one end of the rotary shaft 9 through a coiled spring 21 inserted between the control 19 and the stopper 18, and also is engaged at its tail end with a notched portion 22 formed at the guide lever 11 so that the guide lever 11 may be kept, protruding from the cylindrical side of the rotary frame 8. Thus, when the control 19 is pressed against the coiled spring 21, the tail of stopper 18 swings upwardly to be released from the engagement with the notched portion 22, thereby allowing the guide lever 11 to move radially inwardly by means of the aforesaid coil spring 16.

At one axial end of the tubular shaft 5 corresponding to the rear end of the guide lever 11 there are formed a round portion 5a and an eccentric cam 5b. The round portion 5a and the cam 5b function in such a manner that the guide lever 11, which is moved radially inwardly by the spring 16, is contacted at its inner most end with the round portion 5a, and then is, when the rotary frame 8 rotates, shifted at the rear end from the round portion 5a to the cam 5b. Hence, the cam 5b moves the guide lever 11 radially outwardly to forcibly protrude it from the rotary frame 8 against the spring 16.

Lastly, the transmission for transmitting the rotary force from the handle shaft 24 to the rotary frame 8, comprises a master gear 25 and a pinion 9a in mesh therewith, the master gear 25 being fixed to the inner end of the handle shaft 24 and the pinion 9a, to one axial end of the rotary shaft 9. When the handle shaft 24 is rotated by a handle bar 23 attached to the outer end of the shaft, the rotary force is transmitted therefrom to the rotary shaft 9 through the aforesaid transmission, thereby allowing the rotary frame 8 to rotate.

Also, an anti-reverse gear 26 is insertably fixed to the handle shaft 24 so as to prevent the rotary shaft from rotating reversely to the line-winding direction and a ratchet 27 with a pair of pawls in mesh with the anti-reverse gear 26 is pivoted within the casing 1b through a spindle 29. The ratchet 27 has two thin plates 28 in contact with both surfaces of the gear 26 respectively, which plates sandwich the gear 26 therebetween so that the gear 26 may rotate to allow the ratchet 27 to swing around the spindle 29, whereby one of the pawls 27a and FIG. 6 is meshed with the gear 26, thus preventing the reverse rotation of the handle shaft 24. Additionally, the ratchet 27 is controllable by a lever 30 attached to the casing 1b, so as to select either the pawl 27a or 27b to be meshed with the gear 26.

The reel of the invention is mounted to the fishing rod R through the mounting leg 2 as shown in FIG. 7, in which the reel mounting position can be desirably selected by the angler, that is, a first position where the reel body 1 is mounted to the upper surface of the rod 7 and the handle bar 23 is at the right hand when the angler is gripping the rod, a second position where the reel body 1 is at the upper surface of rod R and the handle bar 23 is at the left hand, a third position where the reel body 1 is at the lower surface of the rod R and the handle bar 23 is at the right hand, and a fourth position where the reel body 1 is at the lower surface of the rod R and the handle bar 23 is at the left hand. These positions are optionally selectively decided by turning the spool 4 upside down, changing the mesh of either the pawl 27a or 27b of the ratchet 27 with the gear 26, or mounting the cover 3 turned from side to side. For example, when formulating the second position, the rotary frame 8 at the second position is reversely rotated to wind the line onto the spool 4, so that the spool 4 is turned upside down and is retained to the disc 1a, through the disc 43 contacted therewith. Then, the ratchet, when the pawl 27a thereof is meshed with the gear 26 at the first position is, changed by the control lever 30 to mesh the pawl 27b with the gear 26, and the cover 3 is half turned by positionally changing the engagement of the male threads 37 with the female 38 respectively, thereby facing the cut-out window 35 to the angler at the second position also. At the third position the cover 3 only is half turned, and at the fourth position the spool 4 is turned upside down and the ratchet 27 is changed to mesh its pawl 27b with the gear 26.

Hence, the angler, when casting, inserts through the window 35 the thumb or forefinger of his hand gripping the rod R so as to press the control 19 against the spring 21, whereby the stopper 18 abouts against the control 19 and swings to be released from the engagement with the notched portion of the guide lever 11, resulting in guide lever 11 moving radially inwardly by the force of the spring 16. Hence, the fishing line P drawn from the spool out through the hole 36 of the cover 3 is released from being retained by the guide lever 11, and simultaneously retained by the angler's finger pressing the control 19. Under these conditions, the angler, while casting, lets his pressing finger go off the control 19, thereby casting the tackle at the end of line P toward his desired place. At this time, the line P, which is being drawn from the spool 4 between the control 19 and the angler's finger, is subjected to the resistance therebetween. The resistance is desirably adjustable by changing the spaced interval between the control 19 and the the finger, thereby performing the so-called thumbing.

On the other hand, when the line with a hooked fish is wound on the spool 4, the handle bar 23 is operated to rotate the rotary frame 8 and let the guide lever 11 extend radially outwardly therefrom. In detail, the guide lever 11 moving radially inwardly in casting as aforegoing abuts at its inward end against the round portion 5a. Under this condition, the stopper 18, when the control 19 is released from being pressed, tends to restore due to the force of spring 21 force. At this time, since the guide lever 11 already has moved radially inwardly, the tail end of the stopper 18 abuts against the lateral side of the guide lever 11, whereby the guide lever 11 is urged toward the spool 4 so as to be rotatable with frame 8. Hence, when the guide lever 11 rotates following the rotary frame 8 rotation by the handle bar 23, the cam 5b pushes the guide lever 11 against the spring 16 so as to protrude from the cylindrical side of the rotary frame 8 through the hole 15 thereof. When the guide lever 11 moves radially outwardly, the stopper 18 falls at its tail end falls into the notched portion 22, thereby keeping the guide lever 11 protruding from the rotary frame. Thus, the fishing line P is caught by the protruding end of the guide lever 11 and thereafter guided therewith so as to be wound on to the spool 4 following the rotation of the rotary frame 8. If the hooked fish draws the winding line too strongly, the control 19 immediately can be pressed to release the line P from being guided by the guide lever 11 so that the line may be drawn from between the control 19 and the angler's finger under the resistance suitable to play the hooked fish. This prevents the line P from being cut.

Alternatively, the aforesaid embodiment of the invention is provided with the cut-out window 35 may be omitted with the stopper 18 being provided outwardly of the casing 1b.

The hole 36, through which the line is drawn out, may be formed at the center portion of the cover 3, but it is preferred that the hole 36 be located slightly out of the center O of the cover 3 oppositely to the direction of drawing out the line to the rod end through the hole 36 as shown by the arrow X in FIG. 2.

In other words, the fishing line, drawn from the cover 3, is bent substantially at a right angle the through hole 36 passing out of the center thereof. Hence, when the hole is at the center of the cover 3, the line passes at the point out of the center of cover 3, that is, out of the center of the spool 4, so that the line is not uniformly wound on the spool by a turn of the handle bar 23. This results in the problem in that the unbalance load, even through slight, is applied to the handle bar 23.

The reason for locating the through hole 36 eccentrically is that the center O of the cover coincides with the point where the fishing line passes out through the hole, whereby the line always can be constantly wound on the spool 4 regardless of the rotating position of the rotary frame 8, resulting in a smoothly handle operation.

The aforesaid leg 2, which is separated from the reel body 1 and fixed thereto by the screw 6 as shown in FIG. 1, may be integrated with the disc 1a or the lid 1c. The leg to be integrated with the lid 1c can be fixed to the reel body 1 through the lid 1c fixed to the disc 1a and the casing 1b.

While a preferred embodiment of the invention has been described using specific terms, such description is for illustrative purpose only, and it is to be understood that changes and variations may be made without departing from the spirit or scope of the following claims.

What is claimed is:

1. A fishing reel mountable to a fishing rod with a handle bar operable to wind a fishing line on a spool, said reel comprising:

(a) a reel body;

said reel body having a rotatable handle shaft carrying a handle bar fixed thereto mounted on said reel body, a rotatable shaft mounted on said reel body at a right angle to said rotatable handle shaft and driven by the rotatable handle shaft and a nonrotatable spool mounted coaxially with said rotatable shaft;

(b) a rotatable frame fixed to said rotatable shaft to be rotatably integral therewith, said rotatable frame having a guide lever for guiding the fishing line to said spool;

(c) a cover for covering said spool and rotatable frame, said cover being mounted to said reel body and having a hole eccentric with respect to a center line of the cover through which said fishing line passes so that the draw-out point of the line coincides with the center of the cover, and (d) a mounting leg for mounting said reel body to said fishing rod, said mounting leg extending from said reel body in a direction parallel to the axis of said rotatable shaft, and having at the end a mount seat of a length extending lengthwise of the fishing rod, said mount seat being substantially at a right angle with respect to the axis of said rotatable shaft, so that said reel body is mounted to said fishing rod through said mounting leg in such a manner that the center line of said through hole extends substantially at a right angle to the longitudinal direction of said rod, whereby the fishing line is drawn out through said through hole toward the end of said rod by being bent substantially at a right angle with respect to the center line of said through hole.

2. The fishing reel as set forth in claim 1, wherein said reel body includes a disc having an inner and rear surface and a casing extending from the rear surface of said disc substantially at a right angle with respect to the rear surface of said disc, so that said rotatable shaft perforates said disc and is supported thereby in the relation of being rotatable with respect thereto, said handle shaft having its axis intersecting at a right angle the axis of said rotatable shaft and being rotatably supported to said casing, said casing housing therein a transmission for transmitting a rotary force from said handle shaft to said rotary shaft, said disc being provided at its inner surface with said spool fixed thereto, at the outer periphery with said cover mounted thereto, and at the rear surface and lateral side of said casing with said mounting leg.

3. The fishing reel as set forth in claim 2, wherein said cover is formed in a cup-like shape and is detachably mounted to the outer periphery of said disc, so that the center line of said through hole at said cover may be substantially at a right angle with respect to the longitudinal direction of said fishing rod when said cover is mounted to said disc.

4. The fishing reel as set forth in claim 1, wherein said through hole is eccentrically formed in said cover with respect to said centerline of the cover in the direction opposite to said fishing line which is drawn out of said cover toeard the fishing rod end.

5. The fishing reel as set forth in claim 1, wherein said cover has a cut-out window large enough for an angler to insert therethrough his finger into said cover.

6. The fishing reel as set forth in claim 1, including a control plate of a disc-like shape and a cut-out window, said rotatable shaft supporting said control plate, said cut-out window being located in said cover radially outwardly of said control plate.

7. The fishing reel as set forth in claim 1, wherein said rotatable frame is formed as a one-end-closed cylinder and is provided with said guide lever in the relation of being movable radially of said rotary frame, said guide lever carrying a spring urging radially inwardly said guide lever said reel body being provided with a tubular shaft fixed thereto co-axially with said rotatable shaft, said tubular shaft having a cam contactable with a tail end of said guide lever, so that said rotatable frame may rotate to allow said guide lever to protrude radially outwardly of the lateral side of said rotatable frame, said rotatable shaft being provided with a stopper supported thereto in the relation of being shiftable to keep said guide lever outwardly protruded, and having a disc-like control plate mounted to the rotatable shaft axially outwardly of said stopper and serving to release said stopper from keeping said guide lever outwardly protruded; and said cover being provided with a cut-out window formed radially outwardly of said control plate, said cut-out window being large enough for an angler to insert his finger thereinto for controlling said control plate.

* * * * *